United States Patent

[11] 3,601,213

[72] Inventor Pierre Patin
58, rue de Sevres, Boulogne-sur-Seine, France
[21] Appl. No. 800,860
[22] Filed Feb. 20, 1969
[45] Patented Aug. 24, 1971
[32] Priority Feb. 22, 1968, Feb. 7, 1969
[33] France
[31] 140,891 and 6902980

[54] STABILIZED THREE-WHEEL VEHICLE
1 Claim, 10 Drawing Figs.
[52] U.S. Cl. .................................................. 180/27, 280/111
[51] Int. Cl. .................................................. B60k 23/04
[50] Field of Search .................................................. 180/27, 41; 280/111, 112

[56] References Cited
UNITED STATES PATENTS
2,663,266 12/1953 Baldwin .................. 280/111 X
2,819,093 1/1958 Geiser .................. 180/27 X
2,887,322 5/1959 DeMonge .................. 280/112 X
2,920,636 1/1960 Gassner .................. 180/41 X
3,016,247 1/1962 Eltze .................. 280/112
3,368,705 2/1968 Orwig et al. .................. 280/111 X
3,480,098 11/1969 Ward .................. 280/111 X
3,504,934 4/1970 Wallis .................. 180/27 X Primary Examiner—Kenneth H. Betts
Attorney—Cameron, Kerkam & Sutton ABSTRACT: This invention is concerned with a stabilized three-wheel vehicle having a steering wheel at the front and two driving wheels at the back, wherein the vehicle comprises a chassis carrying the front steering wheel mounted on a fork with positive play, a rear framework having two driving wheels, and a member which will pivot around the substantially horizontal axis and is disposed between the chassis and the rear framework, a device being provided to enable the pivotal member to be locked.

Fig: 1
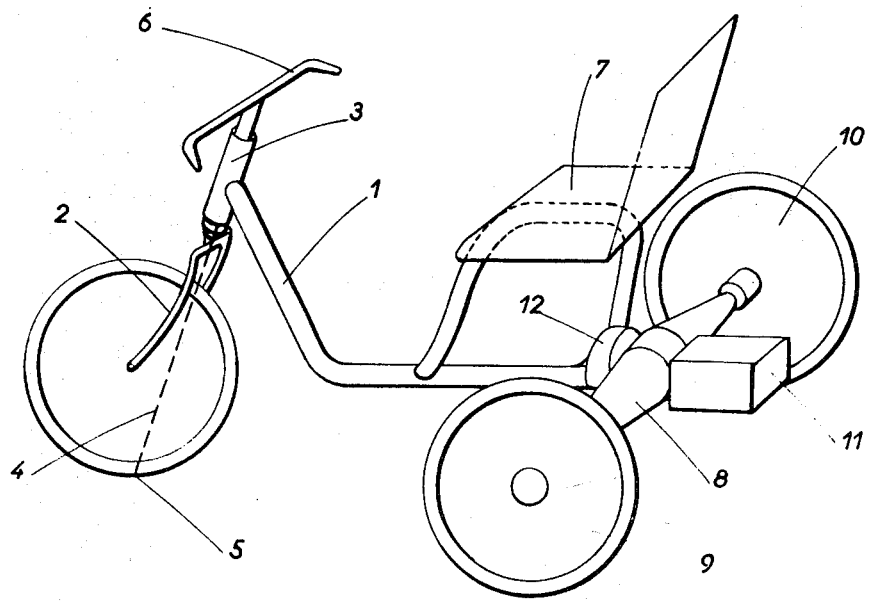
Fig: 2
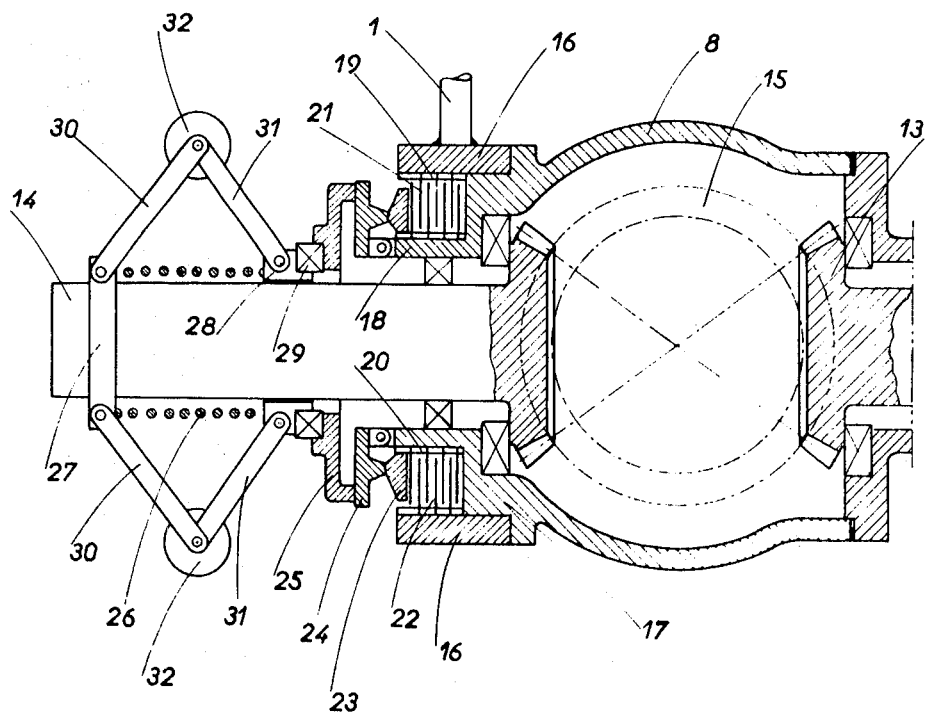

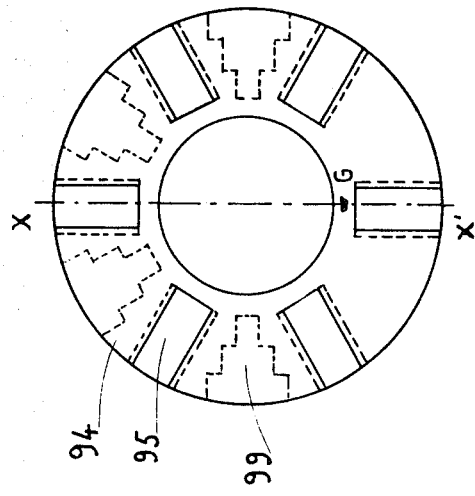
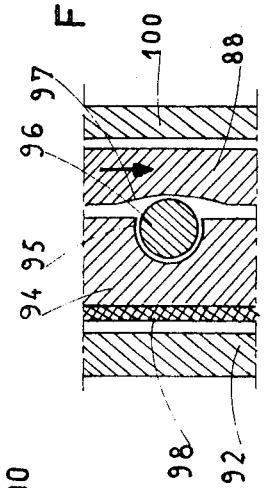
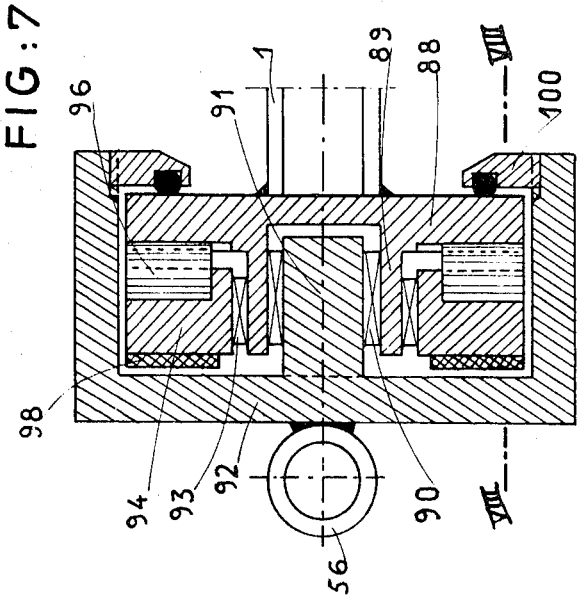

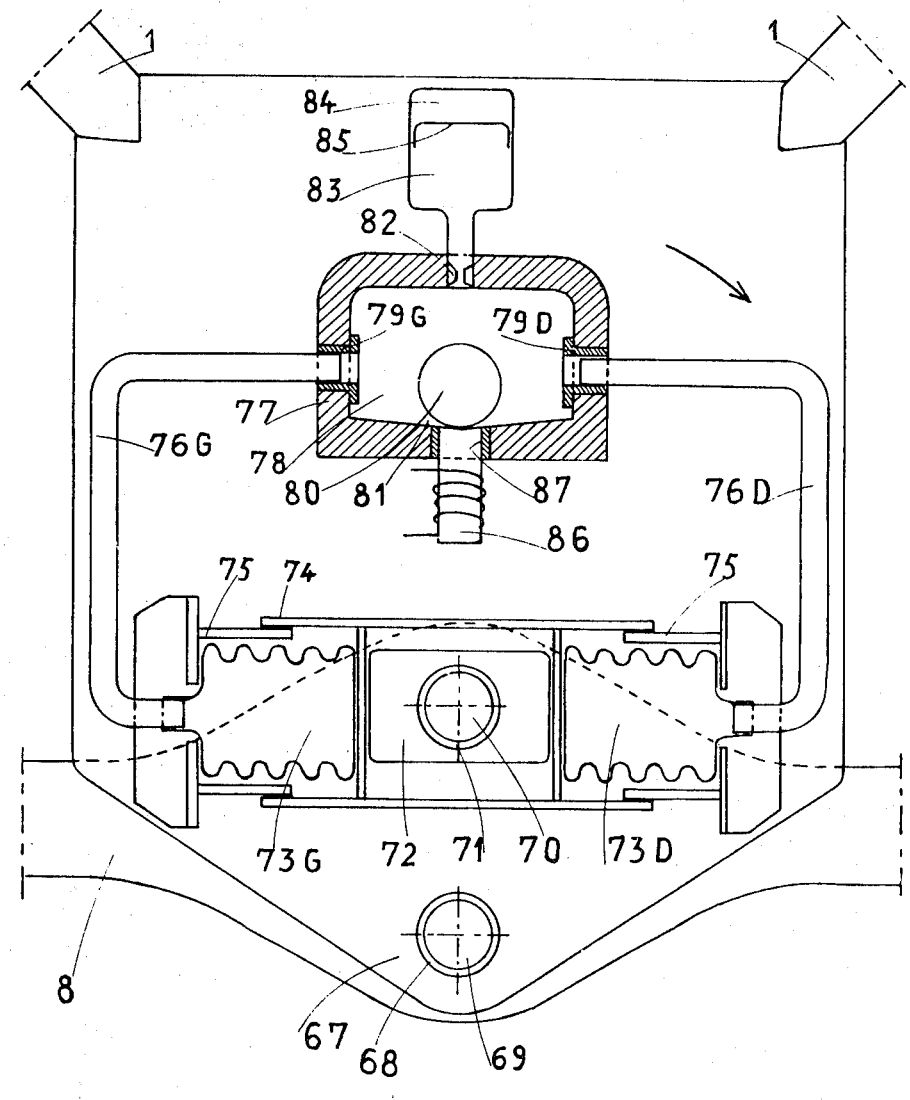
FIG : 10

3,601,213

STABILIZED THREE-WHEEL VEHICLE

U.S. application Ser. No. 62,078, filed Aug. 7, 1970, for Stabilized Three-Wheeled Vehicle is a divisional application herein.

The invention relates to a stabilized three-wheel vehicle.

There are two kinds of stable vehicles. The first kind comprises statically stable vehicles—i.e., vehicles having three, four, or even more wheels; these vehicles are always stable, since the resultant of the forces applied to them both when stationary and moving, in practice their weight and centrifugal force, always passes inside the supporting polygon.

The second kind comprises dynamically stable vehicles—i.e., two-wheeled vehicles such as cycles and motorcycles, for instance, which are stable only from a certain speed onwards, the stability resulting from the combination of the rider's sense of balance with a mechanical device, the positive drive steering. Two-wheeled vehicles move easily and can readily be parked, since they take up only a small amount of space transversely; on the other hand, their instability at low speed and when stationary make them very uncomfortable, since the rider is obliged to place his foot on the ground as soon as he stops, so that no seats or protective carriagework can be provided.

The invention relates to a vehicle of narrow width, which can therefore be compared with two-wheeled vehicles, but which has considerable stability both when stationary and at low speeds.

The invention relates to a stabilized three-wheel vehicle with one driving wheel at the front and two driving wheels at the back, the vehicle being characterized in that it comprises a chassis carrying the front driving wheel mounted on a fork with positive play, a rear framework having two driving wheels, and a member which pivots around the substantially horizontal axis and is disposed between the chassis and the rear framework, a device being provided to enable the pivoting member to be locked.

The invention will now be described in greater detail, by way of example only, with reference to the exemplary embodiments thereof illustrated in the drawings wherein:

FIG. 1 is a diagrammatic perspective view of a vehicle according to the invention;

FIG. 2 is a vertical section through a pivoting member having its locking device, taking the form of a clutch and a centrifugal drive;

Figure 3:
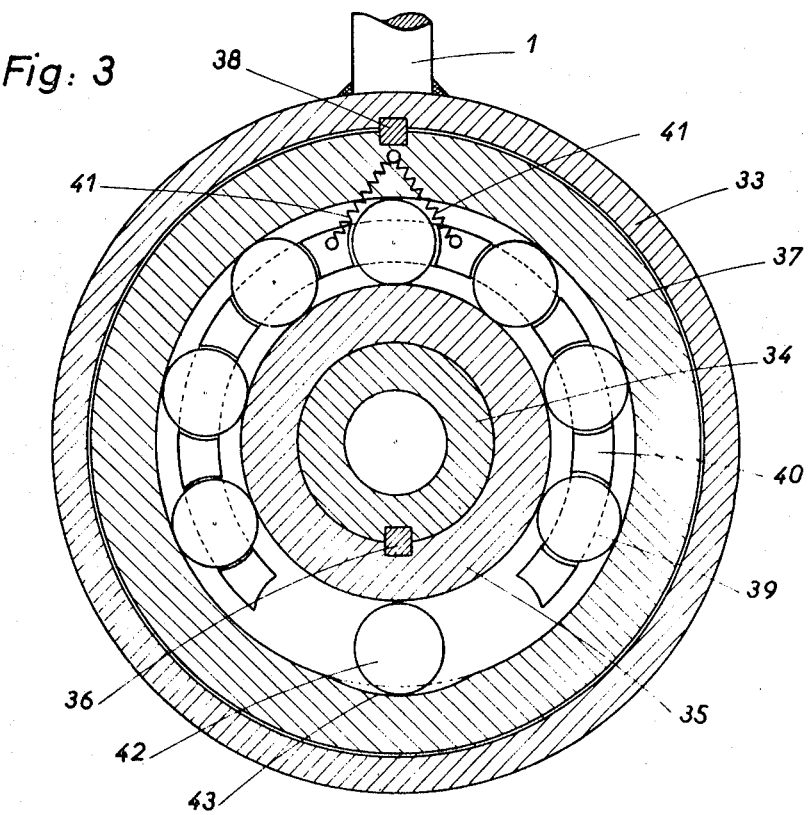
FIG. 3 is a vertical section, taken through a plane perpendicular to the driving shaft, of a variant embodiment of the pivoting member and its locking device taking the form of a bearing.

FIGS. 7-9 show another variant of the locking device using a roller bearing with helical ramps, FIG. 7 being a longitudinal section taken through the axis of articulation, FIG. 8 a partial section taken along the line VIII—VIII in FIG. 3, and FIG. 9 being a separate end view of the plate unitary with the chassis, and FIG. 10 shows another variant embodiment of a locking device, using a hydraulic system.

FIG. 1 is a diagrammatic perspective view of a vehicle comprising a chassis 1 having at the front a fork 2 pivoting in a forwardly inclined bush 3—i.e., having a positive play. The steering axis 4, diagrammatically shown by a chain line continued downwards, meets the ground at a place 5 where the wheel also touches the ground in the normal position. Handlebars 6 enable the vehicle to be steered. The frame has a seat 7 and is articulated to a rear framework 8 around a substantially horizontal axis. The framework 8 comprises the axles of the rear wheels 9, 10 and the differential. The rear axles are driven by an engine 11 attached to the framework 8. According to the invention, a pivoting member 12 is disposed between the chassis 1 and the rear framework 8, and a device is provided which is combined with the pivoting member to enable the latter to be locked.

FIG. 2 shows a special embodiment of the assembly formed by the pivoting member and the locking device. This assembly of the pivoting member and its locking device is extremely important. When the vehicle is at adequate speed, by the action of the steering it behaves like a bicycle, and the pivoting member 12 must be free so that the chassis 1 can be inclined at the rider's will and according to his sense of balance, so as to counteract centrifugal force, the inclination of the chassis always being such that the resultant of weight and centrifugal force is in its central plane. On the other hand, when the vehicle drops to a speed inadequate for dynamic equilibrium, the pivoting member 12 must be locked so as to convert the articulated vehicle into a rigid tricycle having its own stability.

FIG. 2 shows a pivoting member and its locking device, in which the shaft 13 of the engine drives a coaxial shaft 14 via toothed rim 15 of a differential driving the wheels 9, 10. The chassis 1 of the vehicle is unitary with a ring 16 which rotates on a cylindrical bearing 17 unitary with the rear framework 8. The rear framework 8 is also unitary with another cylindrical bearing 18. The ring 16 and the cylindrical bearing 18 are formed with grooves 19, 20 engaged by the teeth of discs 21, 22 of a multiple-disc clutch. The discs 21, 22 are applied against one another by a plate 23 urged by levers 24 articulated to the bearing 18. The levers 24 are urged by a plate 25 experiencing the force of a spring 26 which bears on the one hand against a shoulder 27 and on the other against a ring 28. The shoulder 27 is unitary with the shaft 14. The spring 26 repels the plate 25 via the ring 28 and a bearing 29. Links 30, 31 having regulating weights 32 are articulated to the ring 28 and the shoulder 27.

The apparatus described hereinbefore operates as follows: when the vehicle is moving driven by the shaft 13, the regulating weights 32 move apart and compress the spring 26. The clutch formed by the discs 21, 22 is therefore released, and so is the ring 16, which can therefore rotate. When speed drops below a predetermined value, the regulating weights 32 move towards one another and the spring 26 engages the clutch 21, 22, thus locking the pivoting member.

FIG. 3 shows a variant embodiment. The apparatus comprises a ring 33 unitary with the vehicle chassis 1. A cylindrical bearing 32 is unitary with the rear framework 8. The cylindrical bearing 34 is connected to ring 35 of a bearing via a key 36. The other ring 37 of the bearing is connected to the ring 33 via a key 38. Bearing members 39 are disposed between the two rings and retained by a bearing cage 40. The cage 40 is incomplete, and is retained in the central position by springs 41 attached at one end to the cage 40, and at the other end to the ring 37. A bearing member 42 having a larger diameter than that of the members 39 is disposed in the inner portion of the bearing at a place where the space left for the bearing member is larger than elsewhere. In the embodiment illustrated in FIG. 3, the outer ring 37 of the bearing is formed with a slight recess 43 which receives the bearing member 42 larger than the others. The recess can be ellipsoidal or paraboloidal, and can be connected to, or formed in, the inner bearing path of the ring 37. The bearing member 42 has a diameter larger than the diameter of the members 39, but slightly less than the maximum distance between the ring 35 and the bottom of the recess 43.

This apparatus operates as follows: the bearing member 42 always tends to take up a position in dependence on the direction of the resultant of the weight and centrifugal force. If the plane of the chassis substantially corresponds to the direction of the resultant of weight and centrifugal force, the pivoting member is free. If, on the other hand, this plane deviates in one direction or the other, the bearing member 42 acts as in a roller-type freewheel, and the outer ring 37 is locked. When the vehicle stops, therefore, the chassis takes up a position close to the vertical. The bearing members are preferably rollers.

Figure 4:
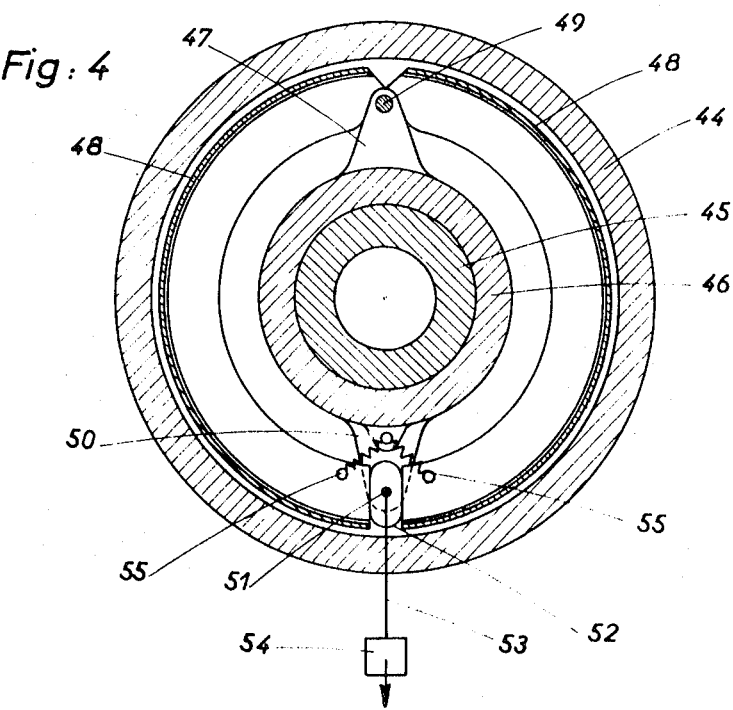
FIG. 4 is a similar view to that shown in FIG. 3 and illustrates a variant embodiment taking the form of a brake drum.

FIG. 4 shows another variant embodiment which comprises a brake drum 44 unitary with the rear framework 8 and a bearing 45 also unitary with the rear framework 8. A sleeve 46 is unitary with the vehicle chassis 1. The sleeve 46 bears two clevises, a clevis 47 to which two brake shoes 48 are articulated on a pivot 49, and a clevis 50 to which there is articulated, around a pivot 51, a cam 52 unitary with a rod 53 bearing a weight 54 forming a pendulum-governor. The cam 52 is disposed between the two brake shoes 48. The brake shoes 48 tend to be applied against the cam 52 by springs 53 attached at one of their ends to the member 46 unitary with the vehicle chassis.

This apparatus operates as follows: when the central plane of the chassis which extends through the axis of articulation 49 of the brake shoes 48, and the axis of articulation 51 of the cam 52, does not coincide with the direction of the resultant of weight and centrifugal force, the cam 52 moves the brake shoes 48 apart and locks the pivoting member.

Figure 6:
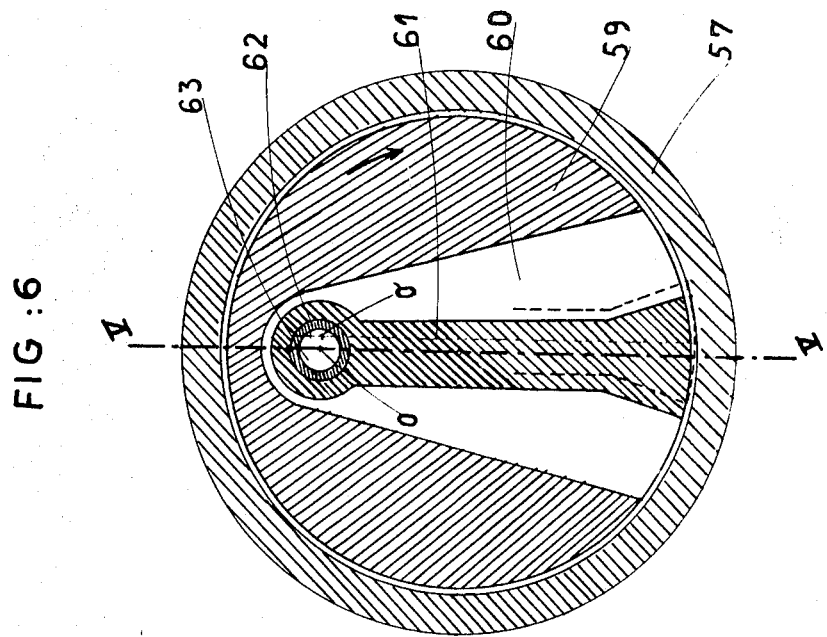
FIGS. 5 and 6 illustrate another variant of the locking device using a pendulum-governor, FIG. 5 being a longitudinal section taken along the line V—V in FIG. 6, and FIG. 6 being a cross section taken along the line VI—VI in FIG. 5.
Figure 5:
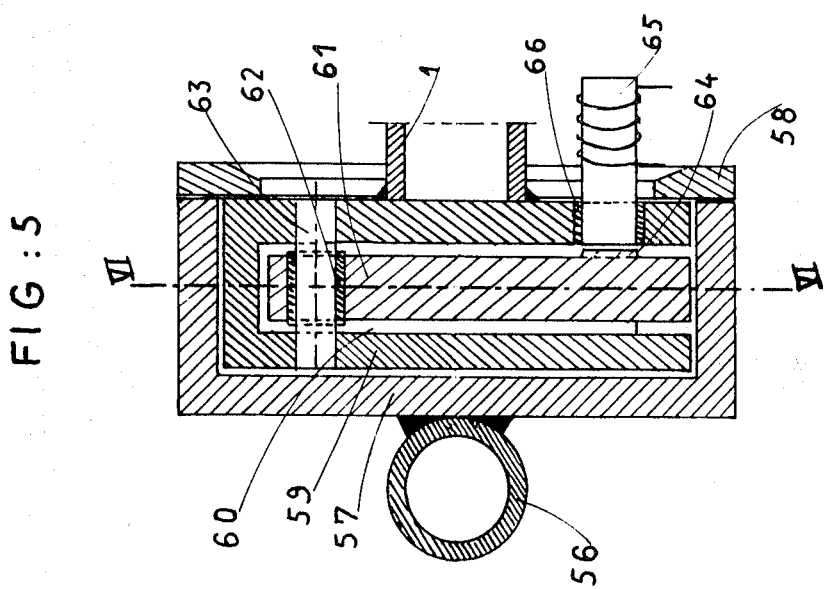

Referring to FIGS. 5 and 6, the rear framework of the vehicle, represented by a tube 56, is welded to a pan 57 closed by a lid taking the form of a circular rim 58 in which a hollow member 59 pivots which is unitary with the vehicle chassis 1. The hollow member is formed by a thick circular plate formed with a recess 60. In the recess 60, a pendulum-governor 61 can move which is articulated via a lubricating ring or a needle bearing 62 to a pivot 63 borne by the hollow member and parallel with the pivoting axis of the articulation. The pendulum 61 has a boss 64 which in the axial position is opposite an electromagnet 65 magnetically insulated from the member 57 by a brass ring 66, and supplied by a tachometric dynamo (not shown) driven by the wheels.

In a device of this kind, if when the vehicle stops the chassis pivots in relation to the axle in the direction indicated by the arrow in FIG. 2, the center 0 of the pivot 63 moves to 0′, and the pendulum 61 takes up the position shown in chain lines and is locked on the pan 57, thus preventing continued rotation. When speed is adequate, the current produced by the tachometric dynamo sets up between the electromagnet 65 and the boss 64 a field which tends to make the movements of the pendulum 61 unitary with those of the hollow member 57, therefore making the chassis independent of the axle.

Referring to FIGS. 7–9, the tube 1 representing the chassis is welded to a plate 88 pivoting via a sleeve 89, with which the plate 88 is unitary, and a needle bearing 90, on a nipple unitary with a pan 92 welded to the axle 56. A special member 94 pivots on the sleeve 89 via a needle bearing 93, the special member 94 being formed by a thick plate formed with recesses 95 which receive rollers 96.

As shown more particularly in FIG. 8, the plate 88 is formed with double helical ramps 97, to the same number as the rollers of the member 94 and facing these rollers. Friction linings 98 are attached to the member 94 on the surface facing the end of the pan 92. The member 94 is also formed with recesses 99, to a lesser number than that of the rollers, so that the center of gravity of the member 94 is eccentric, as shown at G in FIG. 5. The member 94 therefore always tends to rotate so that the axis X—X′ is orientated in accordance with the apparent vertical. A screwed cover 100 closes the pan 92 and enables the clearance between the linings 98 and the end of the pan 92 to be adjusted. If, in a device of the kind specified, the central plane of the chassis 1 moves out of the apparent vertical, the member 88 is displaced, for instance, in the direction indicated by the arrow in FIG. 4, and, via the ramp 97, causes the roller 96 to bear against the recess 95, so that the member 94 bears, via the lining 98, against the ends of the pan 92, thus making the assembly solid. Quite apart from its simplicity of construction, the latter type of articulation has the advantage that it can be readily adjusted by means of the screwed cover 100.

Referring to FIG. 10, the elements of the hydraulic locking system are attached to a plate 67 unitary with the frame 1. The plate 67 bears a sleeve 68 which articulates the chassis 1 to a pivot 69 borne by the axle. The axle also bears a cylindrical nipple 70 which is articulated via a ring 71 in a slide 72 which moves between two metal bellows 73g, 73d filled with oil or some other substantially incompressible liquid. The two bellows, whose expansion and contraction is guided by sliding tubes 74, 75, communicate with a distributor 79 via tubes 76g, 76d.

The distributor 77 is formed by a cavity 78 communicating with the tubes 76g, 76d via orifices 79g, 79d forming valve seats. Each of the valves can be closed by a ball 80 moving over a double ramp 81. A constricted orifice 82 puts the distributor 77 into communication with an accumulator 83 for inert gas 84 compressed by a diaphragm 85. An electromagnet 86, magnetically separated from the distributor 77 by a brass ring 87, and supplied by a tachometric dynamo driven by the wheels (not shown), is disposed in the lower portion of the double ramp 81.

In a device of this kind according to the invention, when the vehicle stops, and the chassis inclines in relation to the axis shown by the arrow in FIG. 6, for instance, the ramp 81 inclines to the right and the ball 80 closes the valve 79d. At the start of the inclining movement of the chassis, the bellows 73g are compressed and their oil is delivered via the tubes 76g, the distributor 77, and the tube 76d to the bellows 73d. As soon as the ball closes the valve 79d, the supply of oil to the bellows 73d is interrupted, and the inclining movement is locked. The shock of the locking is deadened by the supply of oil to the accumulator 83, in which the pressure is regulated as a result. When the vehicle is moving at a speed adequate to produce the dynamic equilibrium of the vehicle, the electromagnet 86 is supplied at a voltage such that the ball is retained in place in spite of the small relative movements of the chassis and the axle.

Of course, the invention is not limited to the embodiments described hereinbefore. For instance, locking might if necessary be controlled by the rider himself. Moreover, the pivoting member and its locking device might comprise various features of the variant embodiments disclosed, with various combinations of such features. For instance, the clutch shown in FIG. 2 might be locked by a pendulum-governor such as has been described with reference to FIG. 4, and acting, for instance, on a double helical ramp.

A pendulum of the kind specified might also control electromagnetic locking or a hydraulic servomechanism, for instance. Similarly, the freewheel might be of the rod or ratchet type, the ratchets being controlled by the pendulum. Also, for instance, in the hydraulic locking device disclosed with relation to FIG. 10, the double ramp 81 might take the form of the arc of a circle, the movement of the ball therefore corresponding more strictly to that of a pendulum. Also, the action of the speed, converted into the action of the electromagnet, might be exerted via a bypass between the tubes 76g, 76d, controlled by a centrifugal device with regulating weights similar to that shown in FIG. 2.

I claim:

1. A stabilized three-wheel vehicle having a steering wheel at the front and two driving wheels at the back comprising a chassis carrying the front steering wheel mounted on a fork with positive play, a rear framework mounting the two driving wheels, a member pivoting around a substantially horizontal axis and disposed between the chassis and the rear framework and a locking device for said pivotal member including a clutch which will come into operation under the action of a return force disposed between the said vehicle chassis and said rear framework and a centrifugal drive connected to the engine shaft and disengaging, in use, against the action of said return force when the speed of the engine shaft exceeds a predetermined value.